(12) United States Patent
Wang et al.

(10) Patent No.: US 7,201,332 B2
(45) Date of Patent: Apr. 10, 2007

(54) ADJUSTABLE SPRAY NOZZLE

(75) Inventors: Po-Hsiung Wang, Miao-Li Hsien (TW); Tzu-Meng Wang, Miao-Li Hsien (TW)

(73) Assignee: Kwan-Ten Enterprise Co., Ltd., Miao-Li Hsien (TW)

( * ) Notice: Subject to any disclaimer, the term of this patent is extended or adjusted under 35 U.S.C. 154(b) by 145 days.

(21) Appl. No.: 11/134,325

(22) Filed: May 23, 2005

(65) Prior Publication Data
US 2006/0273205 A1 Dec. 7, 2006

(51) Int. Cl.
*B05B 7/02* (2006.01)

(52) U.S. Cl. .............. 239/526; 239/525; 239/583; 239/586

(58) Field of Classification Search .......... 239/525, 239/526, 548, 552, 569, 583, 586; 251/38, 251/45, 46, 58
See application file for complete search history.

(56) References Cited

U.S. PATENT DOCUMENTS

| | | | |
|---|---|---|---|
| 5,984,207 A * | 11/1999 | Wang | ............ 239/526 |
| 6,276,659 B1 | 8/2001 | Wang | |
| 6,352,212 B1 | 3/2002 | Wang | |
| 6,390,390 B1 * | 5/2002 | Hung | ............ 239/525 |
| 6,471,145 B1 * | 10/2002 | Huang | ............ 239/526 |
| 6,659,373 B1 | 12/2003 | Heren et al. | |
| 6,685,110 B2 | 2/2004 | Wang | |
| 6,691,937 B2 | 2/2004 | Heren et al. | |
| 6,702,206 B2 * | 3/2004 | Wu | ............ 239/526 |
| 6,796,515 B2 | 9/2004 | Heren et al. | |
| 7,025,291 B2 * | 4/2006 | Wu | ............ 239/526 |

* cited by examiner

*Primary Examiner*—Steven J. Ganey
(74) *Attorney, Agent, or Firm*—Rabin & Berdo, P.C.

(57) ABSTRACT

An adjustable spray nozzle has a body and a valve assembly. The body has an inlet, a nozzle and a valve chamber. The valve chamber is formed between the inlet and nozzle and has two ends. The valve assembly is mounted in the valve chamber, protrudes from the ends and comprises a pushbutton assembly and a valve that protrude from opposite ends. The pushbutton assembly is pushed to allow water to flow through the valve chamber. The valve assembly is rotated to adjust the water flow in very small increments.

12 Claims, 8 Drawing Sheets

ADJUSTABLE SPRAY NOZZLE

BACKGROUND OF THE INVENTION

1. Field of the Invention

The present invention relates to a nozzle, especially to a spray nozzle for a water hose that can be adjusted to control the amount of water that passes through the spray nozzle.

2. Description of the Prior Art

Spray nozzles are used in gardening and car washing. With reference to the U.S. Pat. No. 6,352,212 entitled "Pushbutton controlled sprinkler," a conventional spray nozzle comprises a body, a piston assembly and a pushbutton assembly. The body has two ends, an inlet, an outlet and a control chamber. The inlet and the outlet are formed respectively in the two ends of the body. The control chamber is formed in the body between the inlet and the outlet. The piston assembly is mounted in the control chamber and has a valve. The valve controls the water flow from the inlet to the outlet. The pushbutton assembly is mounted in the control chamber and controls the valve. However, the pushbutton assembly can only switch the capacity of the water flow to several specific flow rates. The conventional spray nozzle cannot adjust the water flow just a little.

To overcome the shortcomings, the present invention provides an adjustable spray nozzle that can adjust the water flow slightly to mitigate or obviate the aforementioned problems.

SUMMARY OF THE INVENTION

The main objective of the present invention is to provide an adjustable spray nozzle for a water hose that can adjust water flow in very small increments. The adjustable spray nozzle has a body and a valve assembly. The body has an inlet, a nozzle and a valve chamber. The valve chamber is formed between the inlet and nozzle and has two ends. The valve assembly is mounted in the valve chamber, protrudes from the ends and comprises a pushbutton assembly and a valve that protrude from opposite ends. The pushbutton assembly is pushed to allow water to flow through the valve chamber. The valve assembly is rotated to adjust the water flow in very small increments.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
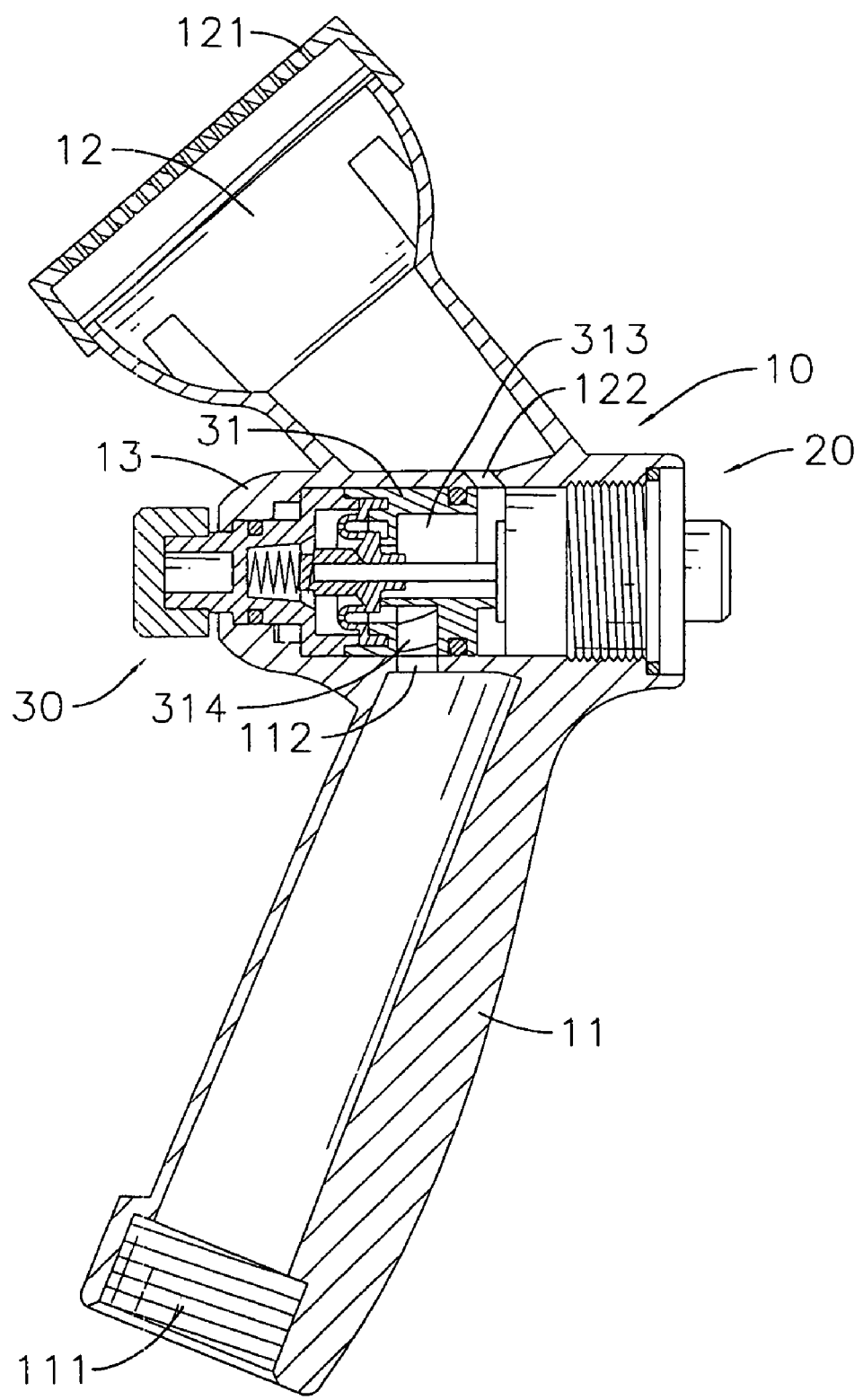
FIG. 1 is a side view in partial section of an adjustable spray nozzle in accordance with the present invention.

With reference to FIG. 1, an adjustable spray nozzle in accordance with the present invention comprises a body (10) and a valve assembly.

The body (10) is hollow and has a proximal end, a distal end, an inlet (11), a nozzle (12) and a valve chamber (13).

The inlet (11) is defined in the proximal end of the body (10) and has a distal end, a proximal end, an inlet connector (111) and an inlet orifice (112). The inlet connector (111) is formed in the distal end of the inlet (11). The inlet orifice (112) is formed in the proximal end of the inlet (11).

The nozzle (12) is defined in the distal end of the body (10) and has an open distal end, a proximal end, a nozzle head (121) and a discharge orifice (122). The nozzle head (121) is mounted on the open distal end. The discharge orifice (122) is formed in the proximal end of the nozzle (12).

Figure 5:
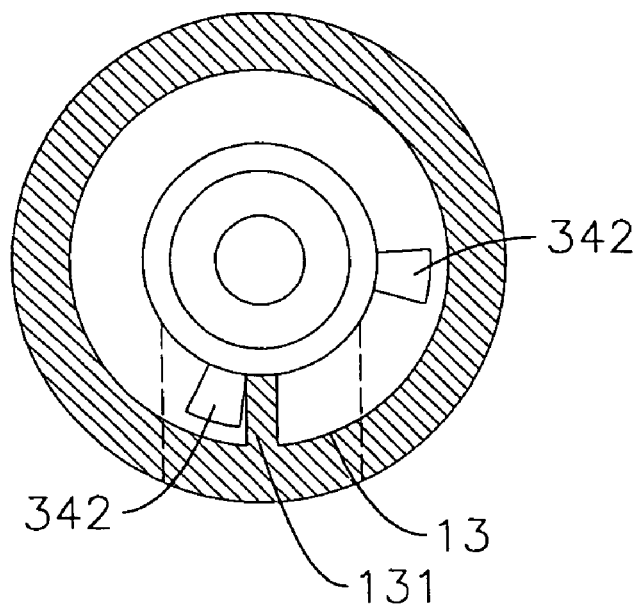
FIG. 5 is an operational front view in partial section of an adjustment knob in a valve chamber of the adjustable spray nozzle in FIG. 1 in a fully open position.
Figure 6:
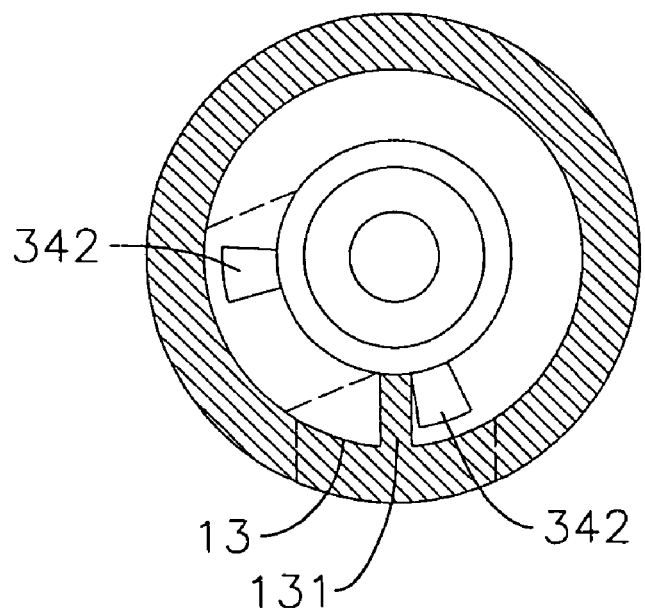
FIG. 6 is an operational front view in partial section of an adjustment knob in a valve chamber of the adjustable spray nozzle in FIG. 1 in a fully closed position.

With further reference to FIGS. 5 and 6, the valve chamber (13) is defined between the inlet (11) and the nozzle (12), communicates with the inlet (11) and nozzle (12) through the inlet and discharge orifices (112, 122) and has two open ends, a limit (131) and an optional inner thread. The limit (131) is formed in the valve chamber (13) near one open end. The inner thread is formed in the valve chamber (13) at the open end opposite to the limit.

The valve assembly is mounted in the valve chamber (13) to control flow between the inlet (11) and the nozzle (12) and comprises a pushbutton assembly (20) and a valve (30).

Figure 2:
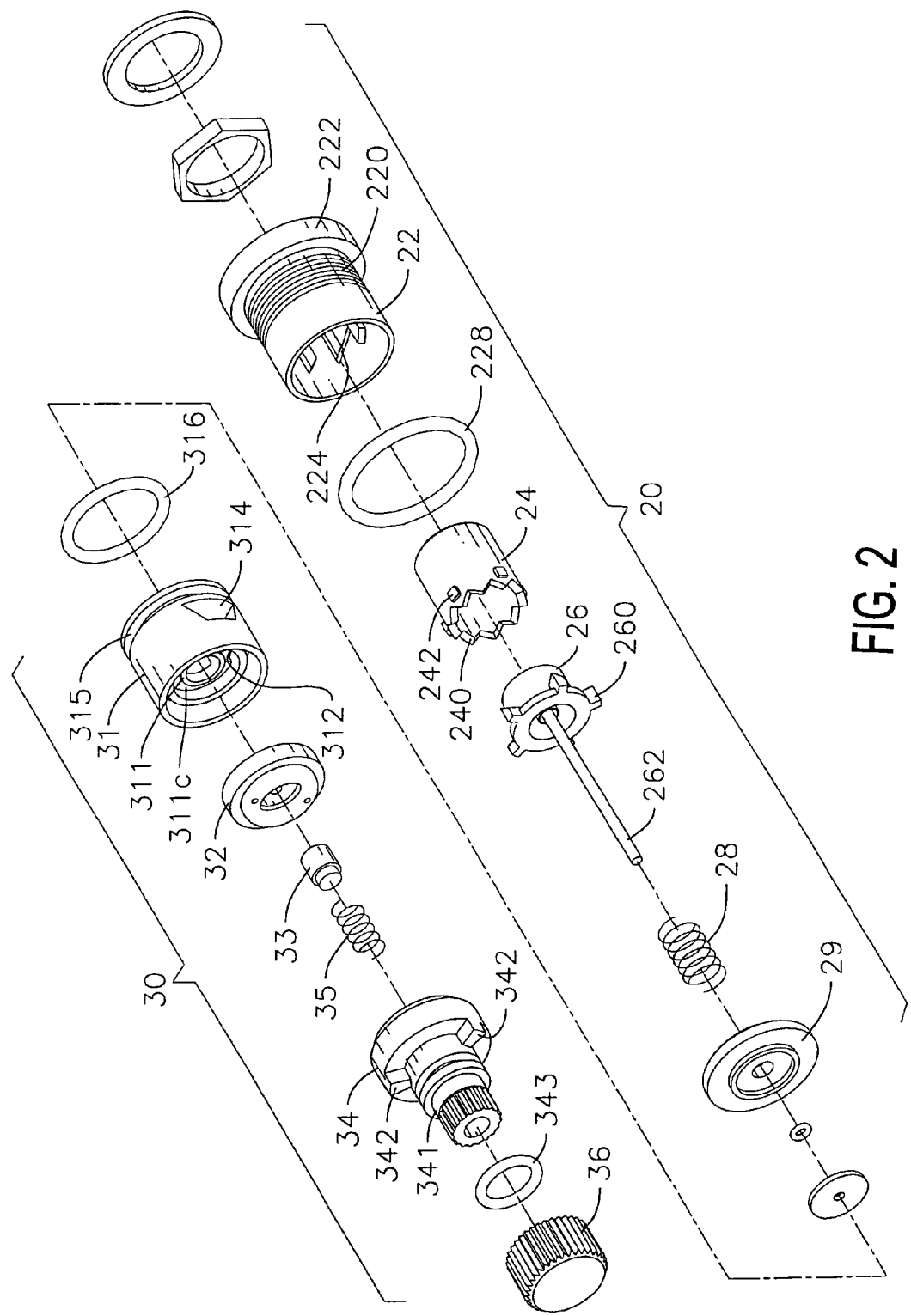
FIG. 2 is an exploded perspective view of a valve assembly in the adjustable spray nozzle in FIG. 1.
Figure 3:
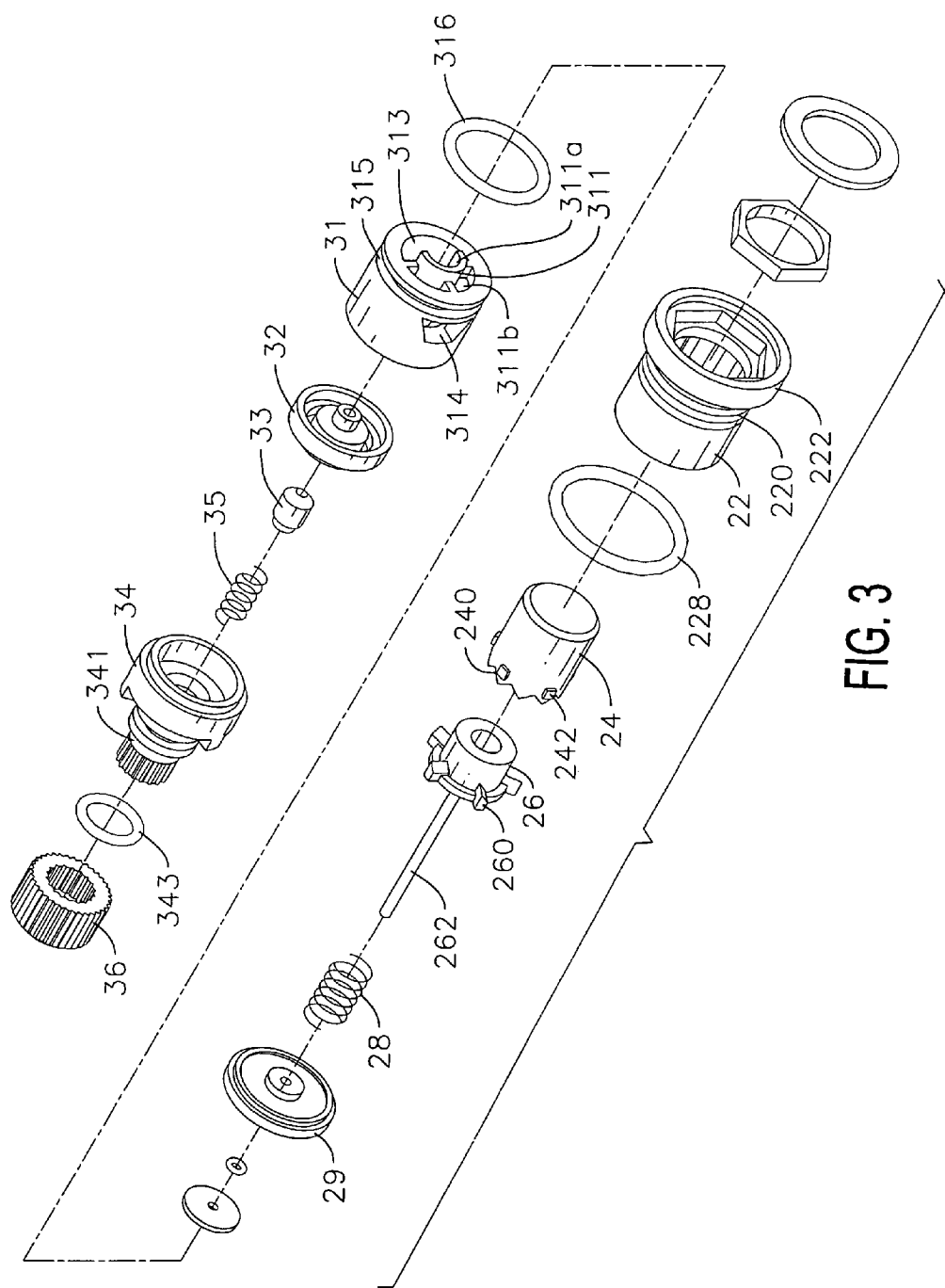
FIG. 3 is an exploded perspective view of the valve assembly in the adjustable spray nozzle in FIG. 2.
Figure 9:
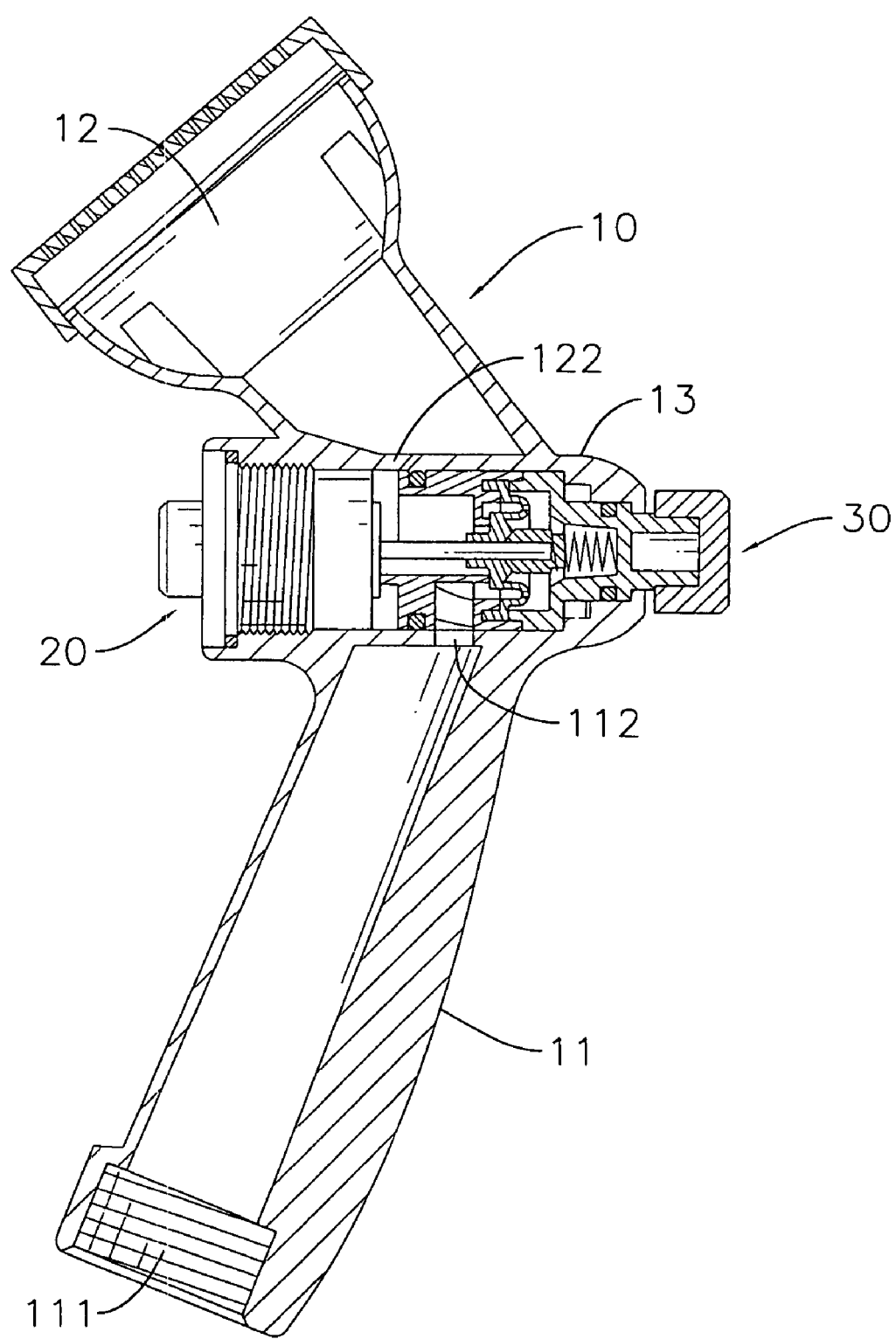
FIG. 9 is a side view in partial section of another embodiment of an adjustable spray nozzle in accordance with the present invention.

With further reference to FIGS. 2, 3 and 9, the pushbutton assembly (20) is mounted securely in the valve chamber (13), protrudes from one open end of the valve chamber (13) and has a sleeve (22), a pushbutton (24), a rotating button (26), a valve stem (262), a spring (28) and a seal (29).

The sleeve (22) is mounted securely in the valve chamber (13) at the open end of the valve chamber (13) opposite to the limit (131) and has an inner opening, an outer opening, an outer wall, an optional thread (220), an optional flange (222), multiple positioning slots (224) and an optional gasket (228). The thread (220) is formed on the outer wall and corresponds to and screws into the inner thread in the valve chamber (13). The flange (222) is formed around the sleeve (22) at the outer opening and abuts the end of the valve chamber (13). The positioning slots (224) are formed longitudinally in the sleeve (22) and are multiple alternating deep slots and shallow slots. The shallow slots are shorter than the deep slots relative to the inner opening of the sleeve (22). The gasket (228) is mounted around the sleeve (22) against the flange (222).

The pushbutton (24) is mounted movably in the sleeve (22), protrudes from the end of the valve chamber (13) and has an outer end, an inner end, an outer wall, multiple teeth (240) and multiple bosses (242). The teeth (240) are formed on and protrude longitudinally from the inner end. The bosses (242) are formed on and protrude radially out from the outer wall and are selectively held respectively in the deep slots in the sleeve (22).

The rotating button (26) is mounted rotatably in the sleeve (22) and has an inner end, an outer end and multiple inclined teeth (260). The inclined teeth (260) are formed on and protrude radially from the inner end of the rotating button (26), are held respectively in either the deep slots or shallow slots in the sleeve (22) and selectively engage the teeth (240) on the pushbutton (24).

The valve stem (262) is mounted in and extends out from the inner end of the rotating button (26) and has a proximal end and a distal end.

The spring (28) is mounted around the valve stem (262) in the rotating button (26).

The seal (29) is mounted around the valve stem (262) against the inner end of the sleeve (22).

The pushbutton (24) is pushed inwardly. The teeth (240) on the pushbutton (24) disengage the inclined teeth (260) from the positioning slots (224), such as deep slots in the sleeve (22) and rotate the rotating button (26) slightly to align the inclined teeth (260) with the teeth (240). Then the pushbutton (24) is released, and the teeth (240) disengage from the inclined teeth (260). The inclined teeth (260) are pushed into the adjacent positioning slots (224), such as shallow slots by the spring (28), and the rotating button (26) rotates until the inclined teeth (260) engage the positioning slots (224). The pushbutton (24) is pushed to shift the inclined teeth (260) to adjacent deep slots or shallow slots.

The valve (30) is mounted in the valve chamber (13), protrudes from the end of the valve chamber (13) opposite to the pushbutton assembly (20) and has a seat (31), a disk (32), a cap (33), an adjustment knob (34), a spring (35) and an optional decorative knob (36).

Figure 4:
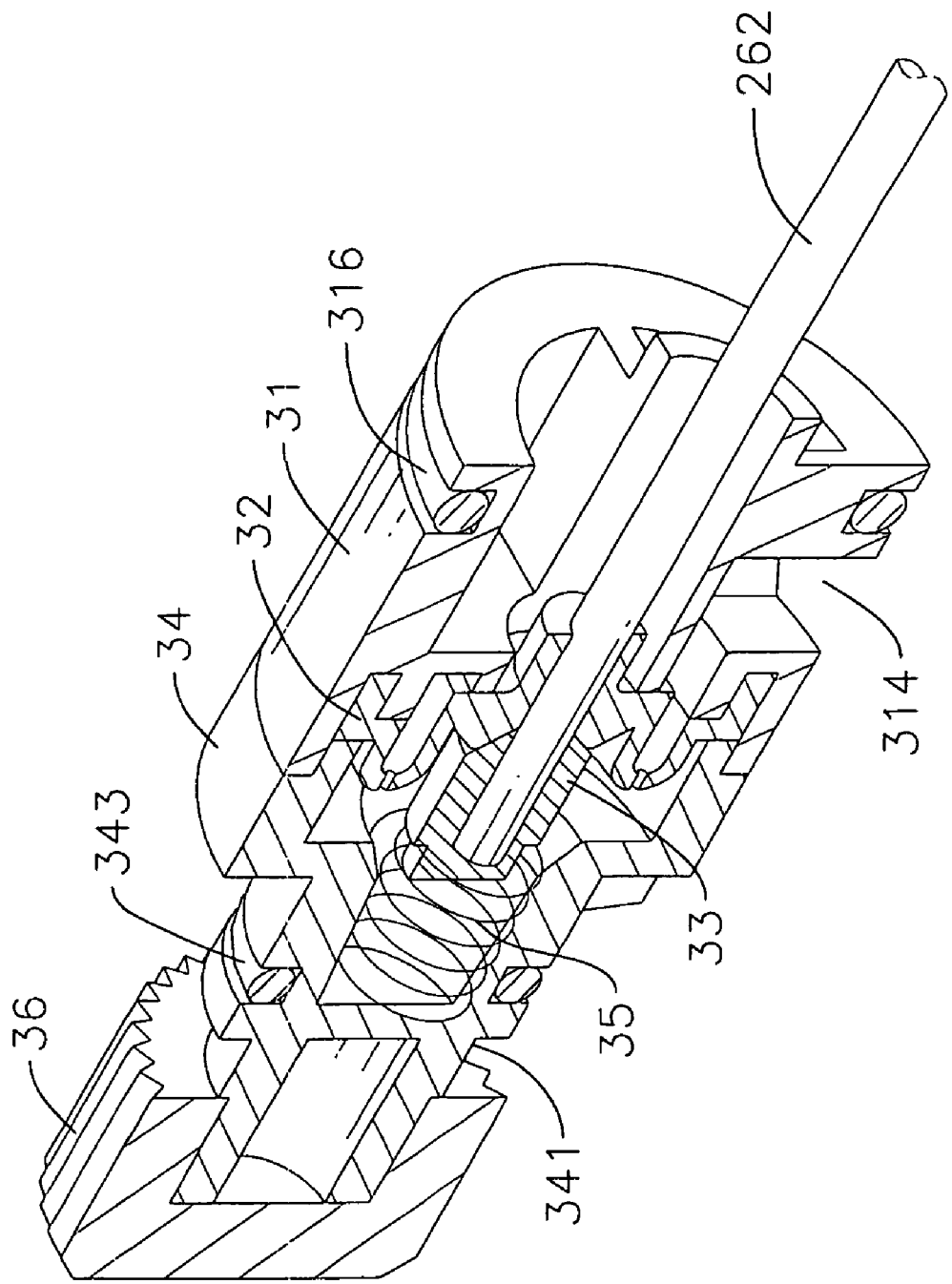
FIG. 4 is a perspective view in partial section of a valve of the adjustable spray nozzle in FIG. 1 that connects to a valve stem.

With further reference to FIG. 4, the seat (31) is mounted rotatably in the valve chamber (13) around the valve stem (262), has an inner opening, an outer wall, an inner wall, an upstream cavity (312), a downstream cavity (313) and an inlet port (314) and may have a central post (311), an upstream partition (311b), a downstream partition (311c), an annular groove (315) and an O-ring (316). The upstream cavity (312) and the downstream cavity (313) are formed opposite to each other in the seat (31) and communicate with each other through the inner opening in the seat (31). The upstream cavity (312) selectively communicates with the inlet (11) in the body (10) through the inlet orifice (112) in the inlet (11). The downstream cavity (313) communicates with the nozzle (12) through the discharge orifice (122) in the nozzle (12). The inlet port (314) is formed in the outer wall of the seat (31) and communicates with the upstream cavity (312). The central post (311) is formed in the seat (31) between the upstream and downstream cavities (312, 313) and has an interior opening and a notch (311a). The interior opening in the central post (311) communicates with the inner opening in the seat (31). The notch (311a) is formed in the central post (311) and communicates with the downstream cavity (313). The upstream partition (311b) is formed transversely in the upstream cavity (312) between the central post (311) and the inner wall of the seat (31). The downstream partition (311c) is formed transversely in the downstream cavity (313) between the central post (311) and the inner wall of the seat (31). The annular groove (315) is formed around the outer wall of the seat (31) near the downstream cavity (313). The O-ring (316) is mounted in the annular groove (315).

The disk (32) may be made by elastomer, is mounted around the valve stem (262) and is selectively attached to and selectively seals the inner opening in the seat (31). The cap (33) is attached to the distal end of the valve stem (262) and selectively abuts the disk (32).

The spring (35) is mounted around the cap (33) and presses against the cap (33) and the inner surface of the adjustment knob (34).

The decorative knob (36) is mounted on the protruding rod (341).

Figure 7:
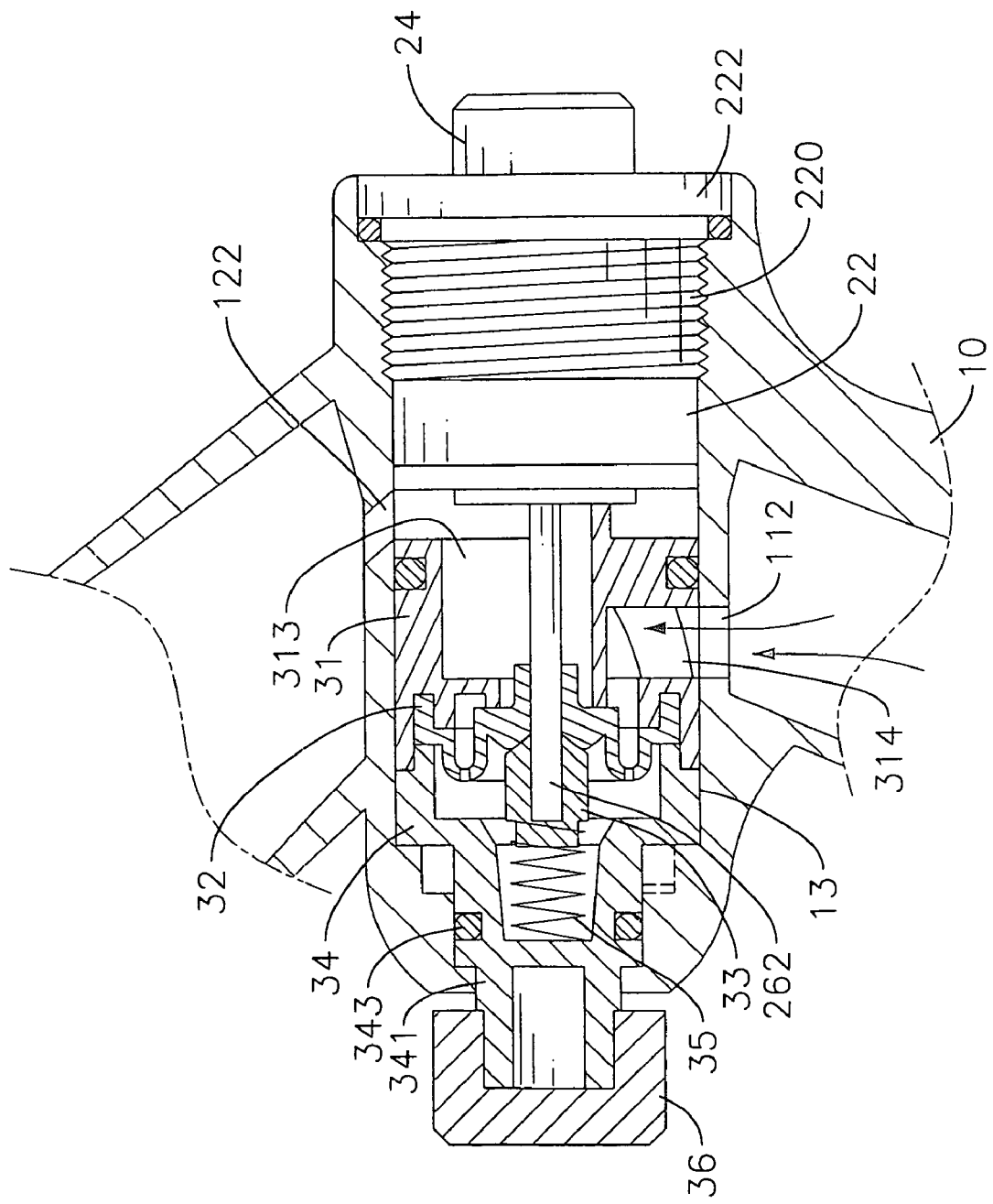
FIG. 7 is an operational side view in partial section of the adjustable spray nozzle in FIG. 1 with the valve closed.

With reference to FIGS. 2, 3 and 7, water is prevented from flowing through the valve chamber (13) when the inclined teeth (260) on the rotating button (26) are in the deep slots in the sleeve (22). The spring (35) presses against the cap (33) that pushes the disk (32) against the inner opening in the seat (31). With the disk (32) pushed against and sealing the inner opening of the seat (31), water cannot flow into the downstream cavity (313) in the seat (31). Therefore, water is not allowed to flow through the valve chamber (13) to the nozzle (12) of the body (10).

Figure 8:
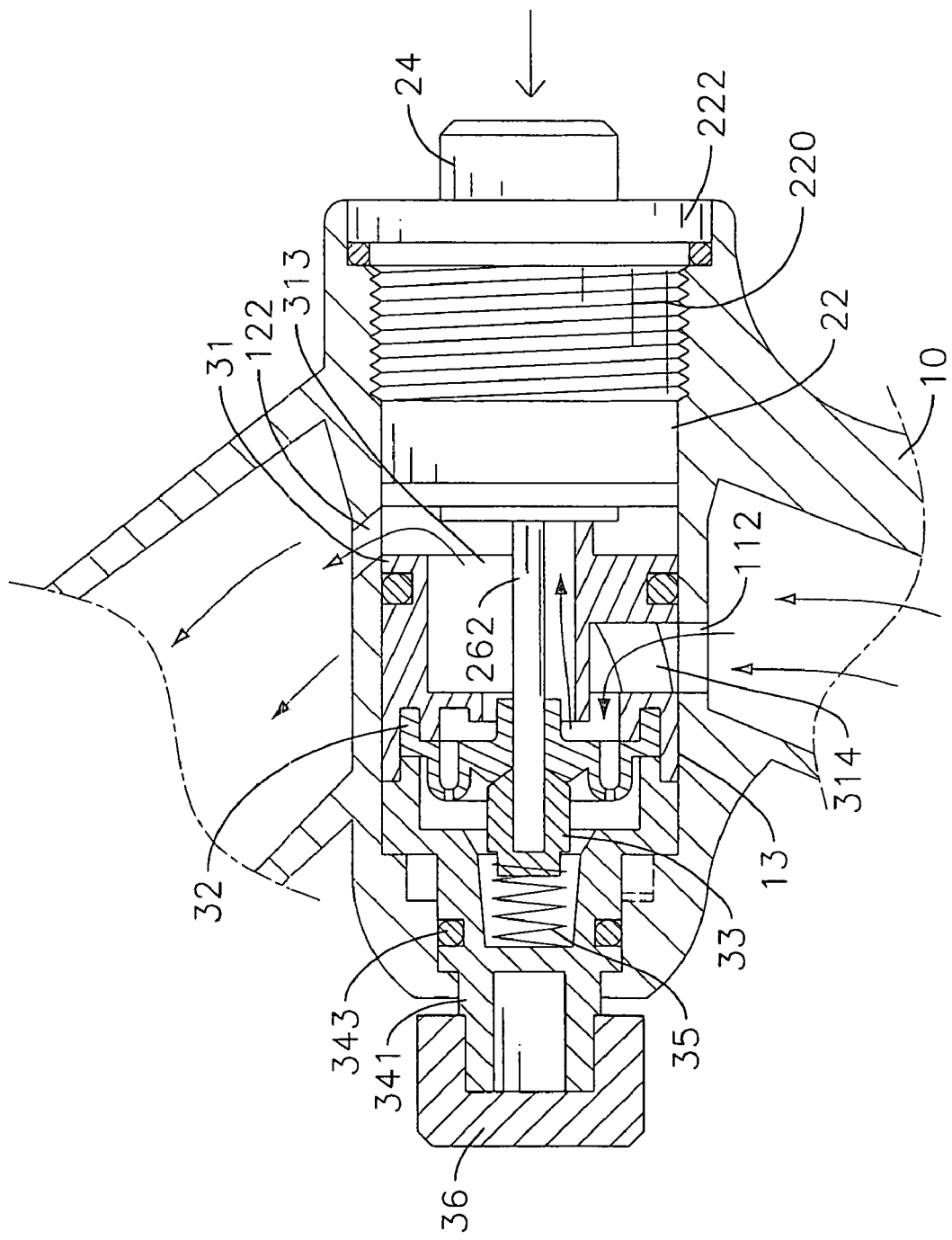
FIG. 8 is an operational side view in partial section of the adjustable spray nozzle in FIG. 1 with the valve open.

With reference to FIGS. 2, 3 and 8, water is free to flow through the valve chamber (13) when the inclined teeth (260) on the rotating button (26) are in the shallow slots in the sleeve (22). The valve stem (262) pushes the cap (33) and compresses the spring (35) away from the disk (32). Therefore, water from the inlet port (314) in the seat (31) pushes the disk (32) away from the inner opening in the seat (31). Water then flows through the inner opening and the downstream cavity (313) in the seat (31) to the nozzle (12).

The adjustment knob (34) is mounted rotatably in the valve chamber (13), protruding from the front end of the valve chamber (13), is attached to the seat (31) around the disk (32) and the cap (33), has an inner surface, an outer surface and two ribs (342) and may have a protruding rod (341) and an O-ring (343). The ribs (342) are formed separately on the outer surface of the adjustment knob (34), extend out radially and selectively abut the limit (131). The protruding rod (341) is formed on the outer surface of the adjustment knob (34) and protrudes from the end of the valve chamber (13). The O-ring (343) is mounted around the protruding rod (341). The adjustment knob (34) is rotated to rotate the seat (31) and adjust the alignment of the inlet port (314) and the inlet orifice (112). The seat (31) is rotated to align the inlet port (314) in the seat (31) with the inlet orifice (112) of the inlet (11). Then, water from the inlet (11) is allowed to flow into the upstream cavity (312) in the seat (31).

The adjustable spray nozzle as described has numerous advantages. Rotating the seat (31) to adjust the alignment between inlet port (314) in the seat (31) and the inlet orifice (112) in the inlet (11) adjusts the water flow from the inlet (11) to the seat (31) in very small increments. The adjustable spray nozzle is also easily assembled.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adjustable spray nozzle comprising
   a body being hollow and having
      a proximal end;
      a distal end;
      an inlet defined in the proximal end of the body and having
         a distal end;
         a proximal end;

an inlet connector formed in the distal end of the inflow part; and an inlet orifice formed in the proximal end of the inflow part;

a nozzle defined in the distal end of the body and having an open distal end;

a proximal end;

a nozzle head mounted on the open distal end; and a discharge orifice formed in the proximal end of the nozzle; and a valve chamber defined between the inlet and the nozzle, communicating with the inlet and the nozzle through the inlet and discharge orifices and having two open ends; and a limit formed in the valve chamber near one open end;

a valve assembly mounted in the valve chamber and having a pushbutton assembly mounted securely in the valve chamber, protruding from one open end of the valve chamber and having a sleeve mounted securely in the valve chamber at the open end of the valve chamber opposite to the limit and having an inner opening;

an outer opening;

an outer wall; and multiple positioning slots formed longitudinally in the sleeve and being alternating multiple deep slots and shallow slots, wherein the shallow slots are shorter than the deep slots relative to the inner opening of the sleeve;

a pushbutton mounted movably in the sleeve, protruding from the end of the valve chamber and having an outer end;

an inner end;

an outer wall;

multiple teeth formed on and protruding longitudinally from the inner end; and multiple bosses formed on protruding radially out from the outer wall and selectively held respectively in the deep slots in the sleeve;

a rotating button mounted rotatably in the sleeve and having an inner end;

an outer end; and multiple inclined teeth formed on and protruding radially from the inner end of the rotating button, held respectively in either the deep slots or shallow slots in the sleeve and selectively engaging the teeth on the pushbutton;

a valve stem mounted in and extending from the inner end of the rotating button and having a proximal end and a distal end;

a spring mounted around the valve stem in the rotating button; and a seal mounted around the valve stem against the inner end of the sleeve; and a valve mounted in the valve chamber, protruding from the other end of the valve chamber opposite to the pushbutton assembly and having a seat mounted rotatably in the valve chamber around the valve stem, and having an inner opening;

an outer wall;

an inner wall;

an upstream cavity formed in the seat and selectively communicating with the inlet in the body through the inlet orifice in the inlet;

a downstream cavity formed in the seat, communicating with the upstream cavity through the inner opening in the seat and communicating with the nozzle through the discharge orifice in the nozzle; and an inlet port formed in the outer wall of the seat and communicating with the upstream cavity;

a disk mounted around the valve stem and selectively attached to and selectively sealing the inner opening in the seat;

a cap attached to the distal end of the valve stem and selectively abutting the disk;

an adjustment knob mounted rotatably in the valve chamber, protruding from the end of the valve chamber, attached to the seat around the disk and the cap and having an inner surface;

an outer surface; and two ribs formed separately on the outer surface of the adjustment knob, extending out radially and selectively abutting the limit; and a spring mounted around the cap and pressing against the cap and the inner surface of the adjustment knob.

2. The adjustable spray nozzle as claimed in claim 1, wherein the seat further has a central post formed in the seat between the upstream and downstream cavities and having an interior opening communicating with the inner opening in the seat; and a notch formed in the central post and communicating with the downstream cavity;

an upstream partition formed transversely in the upstream cavity between the central post and the inner wall of the seat; and a downstream partition formed transversely in the downstream cavity between the central post and the inner wall of the seat.

3. The adjustable spray nozzle as claimed in claim 2, wherein the seat further has an annular groove formed around the outer wall of the seat near the downstream cavity; and an O-ring mounted in the annular groove.

4. The adjustable spray nozzle as claimed in claim 3, wherein the valve chamber of the body further has an inner thread formed in the valve chamber at the open end opposite to the limit; and the sleeve of the pushbutton assembly further has a thread formed on the outer wall of the sleeve and corresponding to and screwing into the inner thread in the valve chamber.

5. The adjustable spray nozzle as claimed in claim 4, wherein the sleeve of the pushbutton assembly further has a flange formed around the sleeve at the outer opening and abutting the end of the valve chamber; and a gasket mounted on the sleeve against the flange.

6. The adjustable spray nozzle as claimed in claim 5, wherein the adjustment knob of the valve assembly further has a protruding rod formed on the outer surface of the adjustment knob and protruding from the end of the valve chamber; and an O-ring mounted around the protruding rod.

7. The adjustable spray nozzle as claimed in claim 6, wherein the valve assembly further has a decorative knob mounted on the protruding rod of the adjustment knob.

8. The adjustable spray nozzle as claimed in claim 1, wherein the seat further has an annular groove formed around the outer wall of the seat near the downstream cavity; and an O-ring mounted in the annular groove.

9. The adjustable spray nozzle as claimed in claim 1, wherein the valve chamber of the body further has an inner thread formed in the valve chamber at the open end opposite to the limit; and the sleeve of the pushbutton assembly further has a thread formed on the outer wall of the sleeve and corresponding to and screwing into the inner thread in the valve chamber.

10. The adjustable spray nozzle as claimed in claim 1, wherein the sleeve of the pushbutton assembly further has a flange formed around the sleeve at the outer opening and abutting the end of the valve chamber; and a gasket mounted around the sleeve against the flange.

11. The adjustable spray nozzle as claimed in claim 1, wherein the adjustment knob of the valve assembly further has a protruding rod formed on the outer surface of the adjustment knob and protruding from the end of the valve chamber; and an O-ring mounted around the protruding rod.

12. The adjustable spray nozzle as claimed in claim 11, wherein the valve assembly further has a decorative knob mounted on the protruding rod of the adjustment knob.

* * * * *